(12) United States Patent
Mandic et al.

(10) Patent No.: US 9,098,525 B1
(45) Date of Patent: Aug. 4, 2015

(54) CONCURRENT ACCESS TO DATA ON SHARED STORAGE THROUGH MULTIPLE ACCESS POINTS

(75) Inventors: Vladimir Mandic, San Jose, CA (US); Michal J. Drozd, Krakow (PL)

(73) Assignee: EMC CORPORATION, Hopkinton, MA (US)

(*) Notice: Subject to any disclaimer, the term of this patent is extended or adjusted under 35 U.S.C. 154(b) by 154 days.

(21) Appl. No.: 13/517,829

(22) Filed: Jun. 14, 2012

(51) Int. Cl.
*G06F 17/30* (2006.01)

(52) U.S. Cl.
CPC .................. *G06F 17/30194* (2013.01)

(58) Field of Classification Search
CPC ............ G06F 17/30194; G06F 3/067
USPC ........................................... 707/654
See application file for complete search history.

(56) References Cited

U.S. PATENT DOCUMENTS

| | | | |
|---|---|---|---|
| 8,296,434 B1* | 10/2012 | Miller et al. | 709/226 |
| 2006/0143290 A1* | 6/2006 | Dostert et al. | 709/224 |
| 2010/0121855 A1* | 5/2010 | Dalia et al. | 707/741 |
| 2011/0252127 A1* | 10/2011 | Iyengar et al. | 709/224 |

* cited by examiner

*Primary Examiner* — Rehana Perveen
*Assistant Examiner* — Alexander Khong
(74) *Attorney, Agent, or Firm* — Dergosits & Noah LLP; Todd A. Noah

(57) ABSTRACT

A method and system for providing shared access to a target storage device by multiple clients through one or more network storage nodes. A network server includes control interfaces to the one or more storage nodes and executes logic processes that control the node processes. The logic processes contain definitions of the storage nodes, maps of which storage nodes have access to the desired target storage, and assigns the preferred storage nodes to the client upon request. Each storage node implements a dynamic volume sharing process that replaces existing monolithic daemon processes and allows for scalability of backup/restore operations and concurrent execution of different storage access operations and different types of storage access operations.

20 Claims, 4 Drawing Sheets

400

| CONTROL LOGIC PROCESSES ||
|---|---|
| Parallelism Check | Datazone<br>Group<br>Client |
| Assignment Check | Pool Assignment<br>Filters |
| Client Configuration Check | Preferred Storage Node |
| Process Check | Availability<br>Operation Type<br>Current Load |

*FIG. 4*

CONCURRENT ACCESS TO DATA ON SHARED STORAGE THROUGH MULTIPLE ACCESS POINTS

BACKGROUND

Disk storage can be presented over a transmission control protocol (TCP) network for shared usage by a number of different users (clients). Access to this shared storage resource can be made available using appropriate network protocols, such as CIFS (Common Internet File System), NFS (Network File System), or any other similar network protocol such as Data Domain® Boost (DD Boost) which is provided by EMC® Corporation. For clients to access such storage, they must have direct connectivity to the network storage devices. Direct client communication is a preferred method, but is not always feasible if the storage is isolated from the clients, which is often the case due to isolation concerns arising out of security issues or physical requirements. Certain backup applications, such as EMC Net-Worker® provide a mechanism for clients to access the shared storage through a central aggregation point, referred to as a storage node. In such systems, remote clients connect to the storage node that reads and writes in order, data to the shared storage on their behalf. This type of system, however, creates bottlenecks since clients must are forced to communicate with a specific pre-determined single storage node to read/write data to the target storage device. Moreover, since read/write operations are handled sequentially, concurrent operations are limited or impractical, as are parallel restoration operations.

Under present systems, clients either require direct access to a target storage device, or must go through a pre-defined single storage node to access the target storage. Multiple clients cannot access the same data unless they use the same storage node. Concurrent access to the same data volume is possible only with direct client communication to the target storage, which by itself may not be possible or desired in a number of cases.

BRIEF DESCRIPTION OF THE DRAWINGS

Advantages of the subject matter claimed will become apparent to those skilled in the art upon reading this description in conjunction with the accompanying drawings, in which like reference numerals have been used to designate like elements, and in which:

FIG. 4 is a table that lists some of the defined validation criteria for the control logic in a dynamic volume sharing process, under an embodiment.

DETAILED DESCRIPTION

The subject matter presented herein provides shared access to a target storage device by multiple clients through one or more network storage nodes. A network server includes control interfaces to the one or more storage nodes and executes logic processes that control the node processes. The logic processes contain definitions of the storage nodes, maps of which storage nodes have access to the desired target storage, and assigns the preferred storage nodes to the client upon request.

Figure 1:
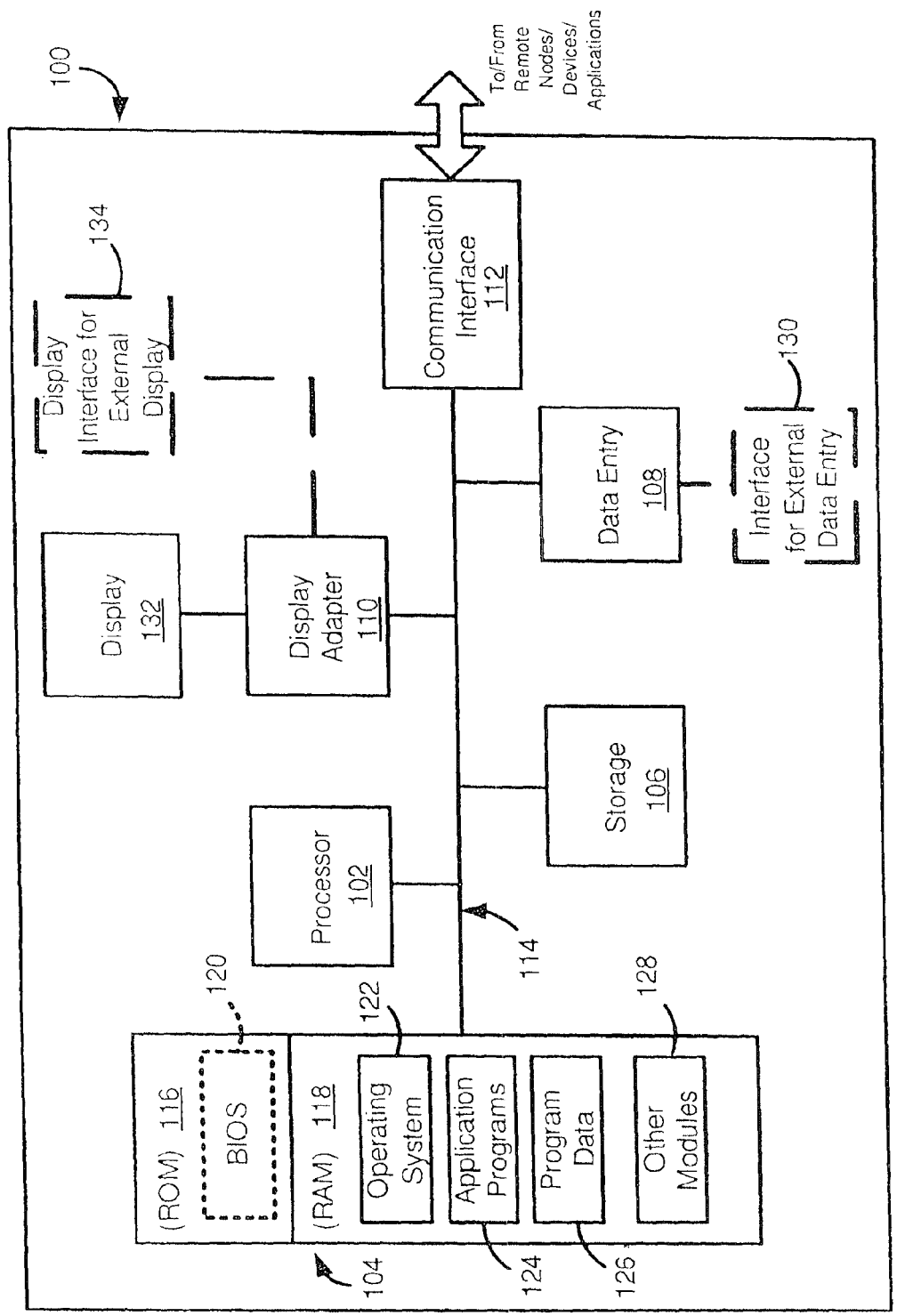
FIG. 1 is a block diagram illustrating an example hardware device in which the subject matter may be implemented.

Prior to describing the subject matter in detail, an exemplary hardware device in which the subject matter may be implemented shall first be described. Those of ordinary skill in the art will appreciate that the elements illustrated in FIG. 1 may vary depending on the system implementation. With reference to FIG. 1, an exemplary system for implementing the subject matter disclosed herein includes a hardware device 100, including a processing unit 102, memory 104, storage 106, data entry module 108, display adapter 110, communication interface 112, and a bus 114 that couples elements 104-112 to the processing unit 102.

The bus 114 may comprise any type of bus architecture. Examples include a memory bus, a peripheral bus, a local bus, etc. The processing unit 102 is an instruction execution machine, apparatus, or device and may comprise a microprocessor, a digital signal processor, a graphics processing unit, an application specific integrated circuit (ASIC), a field programmable gate array (FPGA), etc. The processing unit 102 may be configured to execute program instructions stored in memory 104 and/or storage 106 and/or received via data entry module 108.

The memory 104 may include read only memory (ROM) 116 and random access memory (RAM) 118. Memory 104 may be configured to store program instructions and data during operation of device 100. In various embodiments, memory 104 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 104 may also include nonvolatile memory technologies such as nonvolatile flash RAM (NVRAM) or ROM. In some embodiments, it is contemplated that memory 104 may include a combination of technologies such as the foregoing, as well as other technologies not specifically mentioned. When the subject matter is implemented in a computer system, a basic input/output system (BIOS) 120, containing the basic routines that help to transfer information between elements within the computer system, such as during start-up, is stored in ROM 116.

The storage 106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 100.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 106, ROM 116 or RAM 118, including an operating system 122, one or more applications programs 124, program data 126, and other program modules 128. A user may enter commands and information into the hardware device 100 through data entry module 108. Data entry module 108 may include mechanisms such as a keyboard, a touch screen, a pointing device, etc. Other external input devices (not shown) are connected to the hardware device 100 via external data entry interface 130. By way of example and not limitation, external input devices may include a microphone, joystick, game pad, satellite dish, scanner, or the like. In some embodiments, external input devices may include video or audio input devices such as a video camera, a still camera, etc. Data entry module 108 may be configured to receive input from one or more users of device 100 and to deliver such input to processing unit 102 and/or memory 104 via bus 114.

A display 132 is also connected to the bus 114 via display adapter 110. Display 132 may be configured to display output of device 100 to one or more users. In some embodiments, a given device such as a touch screen, for example, may function as both data entry module 108 and display 132. External display devices may also be connected to the bus 114 via external display interface 134. Other peripheral output devices, not shown, such as speakers and printers, may be connected to the hardware device 100.

The hardware device 100 may operate in a networked environment using logical connections to one or more remote nodes (not shown) via communication interface 112. The remote node may be another computer, a server, a router, a peer device or other common network node, and typically includes many or all of the elements described above relative to the hardware device 100. The communication interface 112 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 112 may include logic configured to support direct memory access (DMA) transfers between memory 104 and other devices.

In a networked environment, program modules depicted relative to the hardware device 100, or portions thereof, may be stored in a remote storage device, such as, for example, on a server. It will be appreciated that other hardware and/or software to establish a communications link between the hardware device 100 and other devices may be used.

It should be understood that the arrangement of hardware device 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 100. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context.

Figure 2:
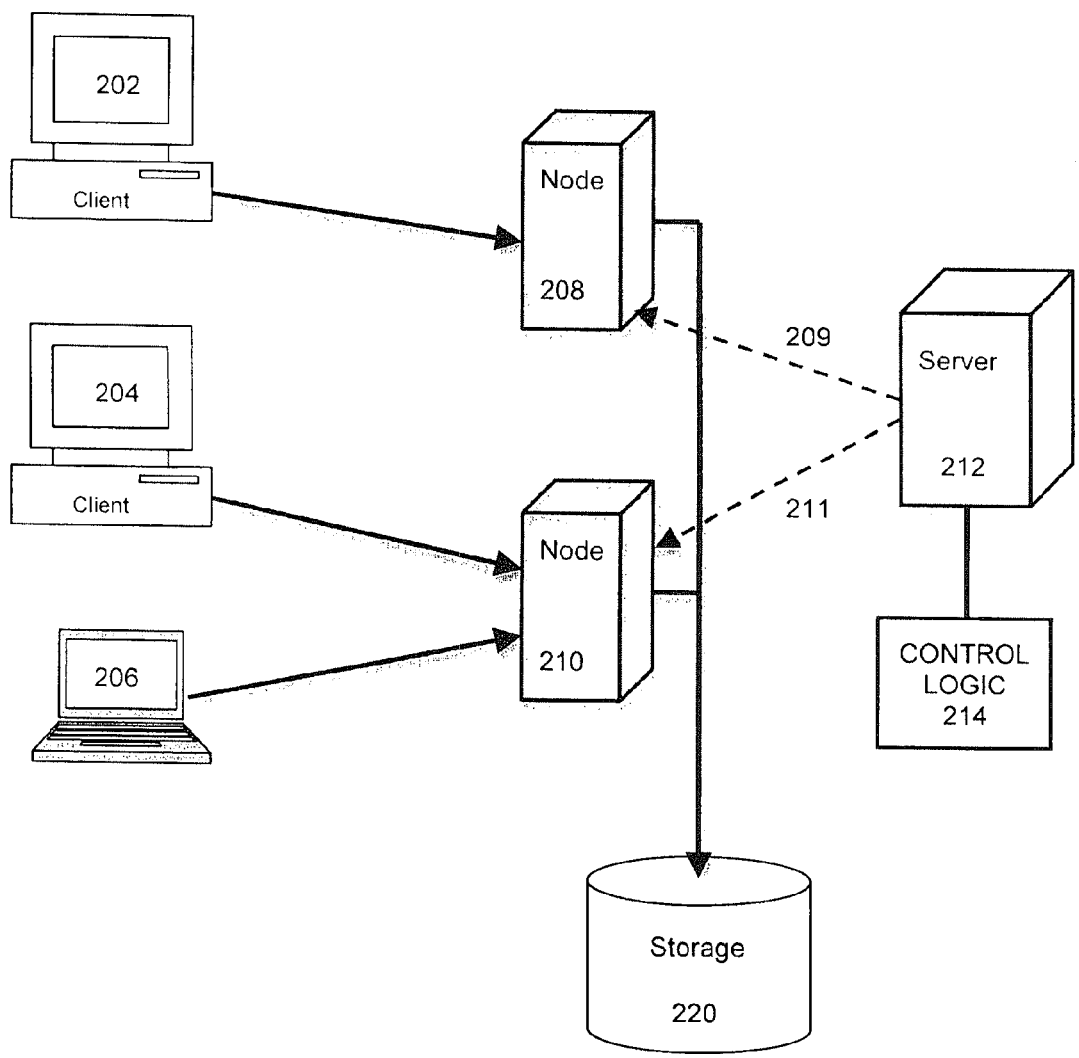
FIG. 2 is a block diagram illustrating an example storage system environment for performing shared access by multiple clients through multiple storage nodes.

FIG. 2 illustrates an example storage system environment for performing shared access by multiple clients through multiple storage nodes. The arrangement of components in FIG. 3 may be implemented by some or all of the components of the hardware device 100 of FIG. 1. As shown in FIG. 2, system 200 includes a number of client computers (network clients) 202-206. These network clients may be embodied in any type of appropriate computer or computing device, such as workstations, personal computers, portable computers, smartphones, personal digital assistants (PDAs), tablet computers, and any similar device. The network clients access data, such as application programs, content data, any other network resources that are stored in data storage 220. Data storage 220 is a random access storage device that may be implemented through any number of individual persistent storage devices, such as a hard drive, RAID arrays, and so on. In general, sequential storage devices, such as tape storage are not used as target storage 212 in system 200. In an embodiment, data storage element 220 appears effectively as a single storage repository to the clients in network 200, even though it may be embodied in a number of individual storage devices. In an embodiment, network 200 may represent a storage system that utilizes deduplication methods, such as the EMC Data Domain deduplication storage system. In general, deduplication systems send only deduplicated and compressed data across the network, thus requiring only a fraction of the bandwidth, time, and cost compared to traditional replication methods. A data domain storage device is typically put on a primary network so that all backup clients 202 to 206 can access the shared or batched storage 212. For isolation and security reasons, the clients of system 200 are not directly coupled to the storage 212, but rather access the storage through respective storage nodes 208, 210 that acts as a gateway to the storage device.

In a typical implementation, each client can only access data on the storage 220 through a specific storage node. Each client utilizes a single storage node only, while each storage node can support one or more clients. Thus, as shown in the example of FIG. 2, client 202 access storage 220 through node 208, and clients 204 and 206 access storage 220 through node 210. Each storage node has a direct interface to the storage 220, which is shared on the network. Each storage node provides access to the storage for their respective clients and performs read/write operations to storage 220 on behalf of these clients. It should be noted that for the example network 200 of FIG. 2, any practical number of client computers (e.g., client 202) and network storage nodes (e.g., node 208) may be supported by server 212 for control of access to storage 220. Network 200 supports different types of storage access operations including backup operations and restore or recover operations.

In an embodiment, a network server 212 is coupled to each storage node through a respective control interface 209 and 211. The network server 212 executes a control logic process 214 that controls the node processes with regard to read/write operations between the clients and the storage. In an embodiment, the control logic process 214 comprises programming structures or processes that contain definitions of the storage nodes, maps of which storage node have access to target storage devices, and assigns preferred storage nodes to clients upon request. The server 212 thus contains definitions of target storage and storage nodes. It also assigns target storage and the preferred path to the target storage to a specific client based on the preferred list. This allows multiple storage nodes to be configured to access the same shared storage device 220. Clients have a preferred list of storage nodes and the server 212 determines, at runtime, the preferred path, validates the accessibility of a storage node and directs clients to perform read/write operations over a specific path.

In an embodiment, each storage node 208 and 210 includes a dynamic volume sharing process that allows the node to be controlled by the control logic process 214 of the server 212. This system replaces the management layer in traditional nodes, and the monolithic daemon process that is typically executed on present storage nodes. Such monolithic daemons of previous systems limited the nodes to accepting one process only at one time, thus limiting the scalability of such nodes. The present dynamic volume sharing process allows the node to scale to specific defined levels, and also allows the node to implement tools such as load-balancing methods, saturation prevention methods, and other similar safeguard and efficiency techniques.

Figure 3:
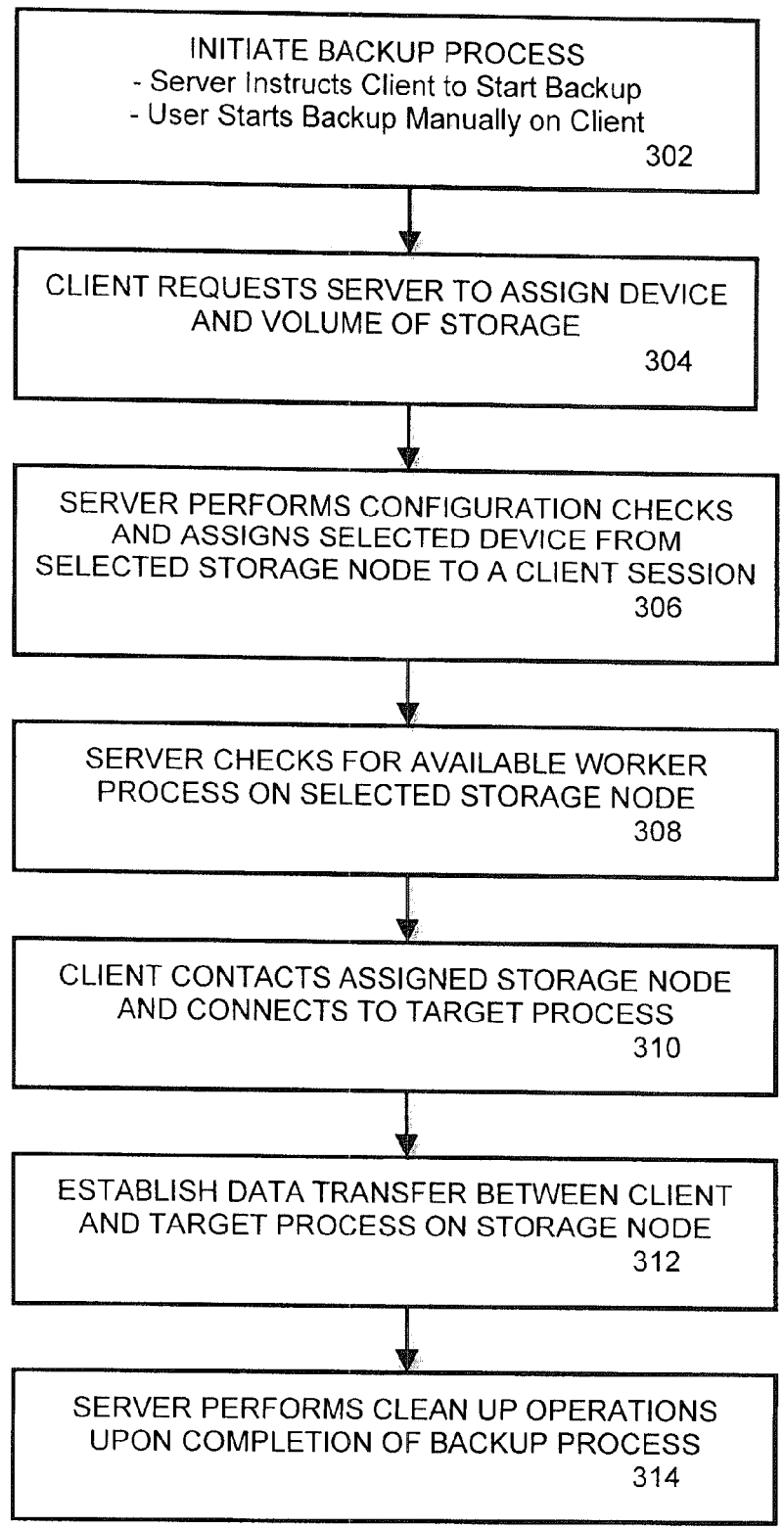
FIG. 3 is a flowchart that illustrates a method of performing concurrent access to shared storage using dynamic volume sharing, under an embodiment.

FIG. 3 is a flowchart that illustrates a method of performing concurrent access to shared storage using dynamic volume sharing, under an embodiment. The process 300 begins with a backup process or operation being initiated, act 302. Such a process serves to make copies of data to be stored on the storage device 220 for persistent storage. Analogous process steps of FIG. 3 may also be performed for a restore operation that writes the stored data from storage device 220 to appropriate files or resources of the network. The backup operation can be initiated in one of two ways: the network server 212 instructs one or more of the clients to start a backup process, or a user starts a backup process manually on a client device. Upon initiation of a backup operation, the client contacts the server 212 and requests that the server assign a device and volume to which to write the copied data, act 304. This comprises a client session for the desired backup operation. The server 212 then executes certain business logic routines of the control logic 214 to perform certain configuration checks. Certain selection criteria of these configuration checks are part of business logic, and includes a check of parallelism and assignments. The control logic checks data zone parallelism, group parallelism, and client parallelism. The control logic also checks pool assignments, filters, and so on, as well as the client configuration for the preferred storage node. The control logic then assigns the selected device from the selected storage node to the present client session, act 306.

As shown in act 308, the server checks for an available worker process on the selected storage node. This check depends on certain criteria, such as: whether or not the process available, whether or not the process marked for the type of operation for the present operation (i.e., backup or restore), and what is the current load (target sessions/max sessions) of the storage node. Depending on the availability and load, the server can either assign the client session an existing process already running on the storage node, or ask storage node to start a new process for the client session. The server then passes the storage node and target process information to the client. The client then contacts the assigned storage node and connects to target process, act 310. As shown in act 312, data transfer is then established between the client and the target process on the storage node. The backup operation is then performed. Upon completion of the backup operation, the server performs certain clean up operations, act 314. In an embodiment, such clean up operations comprise deleting idle tasks to free resources and improve efficiency. This involves checking the usage of the process and seeing if it is idle for specific amount of time. If so, the server requests the storage node to terminate the idle process.

As described with respect to the method of FIG. 3, the control logic process 214 executes certain business logic that performs checks to assign appropriate storage devices and volumes to client sessions based on defined parameters and criteria regarding device and processes within the system. FIG. 4 is a table that lists some of the defined validation criteria for the control logic in a dynamic volume sharing process, under an embodiment. As shown in table 400, the control logic implements certain validation routines for parallelism checks, assignment checks, client configuration, and process checks. The parallelism check verifies whether or not there is present concurrency between data zone, groups or clients. If any parallelism is detected, the redundant elements are combined or deleted as required. The assignment check verifies the data pool assignment and any filters, along with other relevant assignments. The client configuration check determines the preferred storage node for the client whose backup operation is being performed. The process check determines whether or not an available worker process is present on the selected storage node. This validation procedure first checks whether or not the process is available, whether or not it is marked for the particular type of operation presently being performed for the client, and the current load of the available process, if a process is available and of the appropriate type.

In an embodiment, the control logic manages certain configurable values. These include a target sessions (TS) number, which is the number of sessions that the storage device will handle before for another available device is used. This number can be set to any practical value, depending on the application requirements and device types and constraints. For optimum performance, this number should be set to a low value. For example, the default values are four for a generic disk device, and six for a DDBoost device. Generally this value may constrained to an upper limit, such as, it may not be set to a value greater than 60. A maximum sessions (max sessions, MS) value sets the maximum number of sessions supported for the storage device. Again, these values may vary depending on device types and constraints. In an example implementation, this parameter has a default value of 32 for a generic disk device, and 60 for a DDBoost device. In most cases these values provide the best performance, and the maximum set value of 60 provides a built-in safety limit. The limit can be increased at any time as storage performance increases, and there may not necessarily be any hard limit in the product implementation itself. The maximum nsrmmd (max nsrmmd) count parameter is an advanced setting that can be used to increase data throughput by restricting the number of backup processes that the storage node can simultaneously run. When the target or max sessions are changed, the max nsrmmd count is automatically adjusted according to the formula MS/TS+4. The default values in an example system are 12 for a generic disk device and 14 for a DDBoost device).

The server 212 stores the device configuration information for a number of node and storage devices. The logic device configuration information comprises definitions of the storage nodes and maps of which storage nodes have access to the desired target storage in order to allow the control logic to assign the preferred storage nodes to the appropriate client upon request. The organization of the configuration and the composition of the mapping information may be implemented in any manner appropriate to the application and user interface configuration. Provided below is an example presentation and format of configuration information, under an embodiment. In this example, there are three configured devices, each on different system, one on the server itself and two on additional storage nodes). As shown in the example below, all three devices point to same underlying storage. In this example, host2 is much smaller system in terms of hardware capacity, so configurable values are set lower in order to not to overload it.

type: NSR device;
    name: Dev01;
    comment: "Device on SN host1, data is NFS mount (example)";
    device access information: "rd=host1:/data";
    media type: adv_file;
    enabled: Yes;
    target sessions: 4;
    max sessions: 32;
    max nsrmmd count: 4;
    type: NSR device;
    name: Dev02;
    comment: "Device on SN host2, data is NFS mount (example)";
    device access information: "rd=host2:/data";
    media type: adv_file;
    enabled: Yes;
    target sessions: 4;
    max sessions: 8;
    max nsrmmd count: 2;
    type: NSR device;
    name: Dev03;
    comment: "Device on NW server which uses CIFS for access to data";
    device access information: "\\nashost\data <file://\\nashost\data>"; media type: adv_file;
    enabled: Yes;
    target sessions: 4;
    max sessions: 32;
    max nsrmmd count: 4;

It should be noted that the example parameter listings above illustrate only a small sub-set of full configuration values, and parameters relevant for the dynamic volume sharing process are included. Other parameters may be included, as required for specific system and application implementations. Moreover, different formats and organizational structures may be employed depending upon application and user interface requirements.

In an embodiment, network, 200 that implements a dynamic volume sharing process may represent a multi-tenant system wherein a single instance of software runs on a server that serves multiple client organizations (tenants), each running multiple client computers. A software application is designed to virtually partition its data and configuration and each client organization works with a customized virtual application instance. The disk storage system may implement a file system that serves to organize the data that is retained after a program using the data terminates. It provides procedures to store, retrieve, and update the data, and manages the available space on the storage devices that store the data. Various different file systems may be utilized, such as VxFS (Veritas file system) and UFS (Unix file system). Below the filesystem layer could be a volume manager, such as VxVM, HPLVM or Solaris LVM which implements a form of storage virtualization. The volume manager map physical volumes or "physical extents" (e.g., hard disk partitions or logical unit numbers) of an external storage device to logical extents. These logical extents can then be manipulated in flexible ways depending on the types of disk organizations implemented in the system, such as concatenated, striped, mirror, and RAID-based disk organizations. The server assigns an appropriate device and volume in accordance with the specifics of the particular file system upon initiation of the backup process.

In an example implementation of system 200, server computer 212 may be part of a multitenant database platform including to client and storage node networked computers. The network interfaces between these computers may include one or more routers that serve to buffer and route the data transmitted among the computers. The network may be the Internet, a Wide Area Network (WAN), a Local Area Network (LAN), or any combination thereof. The server and storage node computers may be server level computers capable of supporting multiple computers or terminals, and database storage resources. The network may represent any appropriate client-server network, such as a cloud computing environment in which computing resources and storage capacity is provided as a service to a number of different clients. As stated above, an illustrative application of such an environment is a multi-tenant database system in which various elements of hardware and software of the database system may be shared by one or more customers. For example, a given application server may simultaneously process requests for a great number of customers, and a given database table may store data elements for a potentially large number of clients. In this type of environment, each of the servers may implement control logic that controls access by different clients using storage nodes that each implement a dynamic volume sharing process.

The dynamic volume sharing method described herein provides shared access to a target storage device by multiple clients through one or more network storage nodes. The network server includes control interfaces to the one or more storage nodes and executes logic processes that control the node processes. The logic processes contain definitions of the storage nodes, maps of which storage nodes have access to the desired target storage, and assigns the preferred storage nodes to the client upon request. This method and any implementing systems or circuits provide advantages over present systems in which multiple clients cannot access the same data unless they use the same storage node, or that prevent concurrent access to the same data volume unless there is direct client communication to the target storage.

In the present disclosure, the use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law.

Moreover, any combination of the above-described elements in all possible variations thereof is encompassed unless otherwise indicated herein or otherwise clearly contradicted by context.

What is claimed is:

1. A computer-implemented method of providing concurrent access to data on a shared storage device, the method comprising:
    storing, in a server coupled to a plurality of clients through a plurality of storage nodes, definition information for the shared storage device and the plurality of storage nodes, and a mapping of access of each of the plurality of storage nodes to the shared storage device;
    determining a list of one or more storage nodes from each of the plurality of clients;
    assigning, upon receipt of a storage access request by a client, a path to a volume of the storage node based on the mapping and the list of the client;
    performing, upon receipt of the request to perform the storage access operation from the client, a check of parallelism for redundant data and clients, and a check of client configuration for the storage node specified by the client; and
    assigning a selected device from a selected storage node to a client session created for the storage access operation.

2. The method of claim 1 wherein the storage access request comprises a request to perform one of a data backup operation and a data restore operation.

3. The method of claim 2 wherein the shared storage device comprises a random access disk storage device or array.

4. The method of claim 3 further comprising:
    performing a check for available worker processes on the selected storage node based on availability, compatibility of storage access operation type and current load of the selected storage node.

5. The method of claim 4 further comprising assigning the client session to an existing process already running on the selected storage node or causing the storage node to start a new process for the client session.

6. The method of claim 5 further comprising defining a plurality of parameters for each of the plurality of storage nodes, the parameters comprising a target sessions value defining a threshold number of sessions a storage device will accommodate before another storage device is utilized, and a maximum sessions value defining maximum number of sessions the storage device can accommodate.

7. The method of claim 6 wherein the current load of the selected storage node is determined by dividing the target sessions value by the maximum sessions value from the parameters of the selected storage node.

8. The method of claim 7 further comprising defining a count parameter that increases data throughput through the selected storage node by limiting the number of backup processes that the selected storage can simultaneously execute, wherein count parameter is a function of the maximum sessions value and the target sessions value.

9. The method of claim 1 further comprising executing, upon completion of an operation specified by the storage access request, a clean up routine comprising:
    determining usage of a client process of the operation;
    determining whether the client process has been idle for a defined amount of time; and
    causing the client process to terminate if the client process has been idle for at least the defined amount of time.

10. A computer-implemented method of providing concurrent access to data on a shared storage device, the method comprising:

storing, in a server coupled to a plurality of clients through a plurality of storage nodes, definition information for the shared storage device and the plurality of storage nodes, and a mapping of access of each of the plurality of storage nodes to the shared storage device;

receiving a request to perform a storage access operation from a client of the plurality of clients;

performing a check of parallelism for redundant data and clients;

performing a check of client configuration for storage node specified by the client;

assigning a selected device from a selected storage node to a client session created for the storage access operation;

checking for available worker processes on the selected storage node based on availability, compatibility of storage access operation type and current load of the selected storage node;

assigning the client session to an existing process already running on the selected storage node or causing the storage node to start a new process for the client session;

determining a list of one or more storage nodes from each of the plurality of clients; and assigning, upon receipt of a storage access request by a client, a path to a volume of the storage node based on the mapping and the list of the client.

11. The method of claim 10, further comprising
validating the accessibility of a storage node in the path to allow the client to perform the storage access.

12. The method of claim 11 wherein the storage access request comprises a request to perform one of a data backup operation and a data restore operation, and wherein the shared storage device comprises a random access disk storage device or array.

13. The method of claim 5 further comprising:
defining a target sessions value dictating a threshold number of sessions a storage device will accommodate before another storage device is utilized;
defining a maximum sessions value dictating maximum number of sessions the storage device can accommodate; and
defining a count parameter that increases data throughput through the selected storage node by specifying a maximum number of backup processes that the selected storage can simultaneously execute, wherein count parameter is a function of the maximum sessions value and the target sessions value.

14. The method of claim 13 wherein the current load of the selected storage node is determined by dividing the target sessions value by the maximum sessions value from the parameters of the selected storage node.

15. The method of claim 14 further comprising executing, upon completion of an operation specified by the storage access request, a clean up routine comprising:
determining usage of a client process of the operation;
determining whether the client process has been idle for a defined amount of time; and
causing the client process to terminate if the client process has been idle for at least the defined amount of time.

16. A computer program product, comprising a non-transitory computer-readable medium storing computer-readable program code to be executed by one or more processors, the computer-readable program code including instructions to:
store, in a server coupled to a plurality of clients through a plurality of storage nodes, definition information for the shared storage device and the plurality of storage nodes, and a mapping of access of each of the plurality of storage nodes to the shared storage device;
determine a list of one or more storage nodes from each of the plurality of clients;
assign, upon receipt of a storage access request by a client, a path to a volume of the storage node based on the mapping and the list of the client;
perform, upon receipt of the request to perform the storage access operation from the client, a check of parallelism for redundant data and clients, and a check of client configuration for the storage node specified by the client; and
assign a selected device from a selected storage node to a client session created for the storage access operation.

17. A system for providing concurrent access to data on a shared storage device, the system comprising:
a processor-based storage management system executed on a server computer system controlling access between a plurality of clients and a shared storage device through a plurality of storage nodes, the server executing a control process configured to store definition information for the shared storage device and the plurality of storage nodes, and a mapping of access of each of the plurality of storage nodes to the shared storage device, determine a list of one or more storage nodes from each of the plurality of clients, assign, upon receipt of a storage access request by a client, a path to a volume of the storage node based on the mapping and the list of the client, perform, upon receipt of the request to perform the storage access operation from the client, a check of parallelism for redundant data and clients, and a check of client configuration for the storage node specified by the client, and assign a selected device from a selected storage node to a client session created for the storage access operation; and
a control interface between the server computer and the plurality of storage nodes.

18. The system of claim 17 wherein the storage access request comprises a request to perform one of a data backup operation and a data restore operation, and wherein the shared storage device comprises a random access disk storage device or array.

19. The system of claim 18 wherein the control process is further configured to:
check for available worker processes on the selected storage node based on availability, compatibility of storage access operation type and current load of the selected storage node.

20. The system of claim 19 wherein the control process is further configured to assign the client session to an existing process already running on the selected storage node or causing the storage node to start a new process for the client session.

* * * * *